United States Patent [19]

Caponi et al.

[11] Patent Number: 4,759,625
[45] Date of Patent: Jul. 26, 1988

[54] METHOD OF AND APPARATUS FOR THE MEASUREMENT OF MODE FIELD RADIUS IN SINGLE-MODE FIBRES

[75] Inventors: Renato Caponi; Gianni Coppa; Pietro Di Vita, all of Turin, Italy

[73] Assignee: Cselt - Centro Studi e Laboratori Telecomunicazioni SpA, Turin, Italy

[21] Appl. No.: 931,736

[22] Filed: Nov. 17, 1986

[30] Foreign Application Priority Data

Nov. 15, 1985 [IT] Italy ................................ 67966 A/85

[51] Int. Cl.$^4$ ............................................. G01N 21/84
[52] U.S. Cl. ................................................... 356/73.1
[58] Field of Search ......................................... 356/73.1

[56] References Cited

U.S. PATENT DOCUMENTS 4,636,071  1/1987  Lowe et al. ........................ 356/73.1
4,664,516  5/1987  Coppa et al. ...................... 356/73.1

*Primary Examiner*—Vincent P. McGraw
*Attorney, Agent, or Firm*—Herbert Dubno

[57] ABSTRACT

Mode field radius in single-mode optical fibers is measured by the modulation of an optical beam by means of a spatial filter with radial-distribution of transmittivity of Gaussian type. Modulated beam intensity is measured in correspondence with the beam axis for different widths of the Gaussian curve, and the mode field radius is derived from both such intensity values and a parameter dependent on the Gaussian width.

14 Claims, 3 Drawing Sheets

METHOD OF AND APPARATUS FOR THE MEASUREMENT OF MODE FIELD RADIUS IN SINGLE-MODE FIBRES

FIELD OF THE INVENTION

The present invention relates to a method of and an apparatus for characterization of optical fibers for telecommunications and, more particularly, relates to a method of and a device for measuring the mode field radius in a single-mode optical fiber.

BACKGROUND OF THE INVENTION

Dimensional parameters are of major importance for single-mode optical fiber characterization. Dimensional parameters include both geometrical/structural features of the fiber (core and cladding radius, maximum numerical aperture, etc.), and properties depending on the propagation (mode-field dimensions and shape). The former properties are obviously of fundamental importance as to design of the fiber, while the latter properties (mode parameters) are of major importance in the characterization as to the intended use, since they allow joint losses, microbending losses and coupling efficiency to be determined, thus allowing a correct connection dimensioning.

Different definitions have been given up to now for such mode parameters and, in particular, for the mode field radius.

A definition frequently applied in the measurements gives mode field radius as the mean square width of the near-field and as the inverse of the far-field width.

The near-field value gives information on joint losses in the case of angular misalignment and on microbending losses, while the far-field value gives information on joint losses due to transverse offset and on guide dispersion.

The application of such definitions requires a double series of measurements, namely a near-field and a far-field measurement, for fiber characterization. For this reason, standardizing authorities are oriented towards different definitions of the mode-field radius: among these definitions, the width $w_b$ of the gaussian souce which affords maximum power coupling into the fiber is of particular interest, since from this definition values are obtained which are a good compromise between near-field and far-field values.

Denoting by $\phi(r)$ the field associated with the fiber ($r$=radial coordinate), and by $G(r, w) = \exp(-r^2/2w^2)$ the source field ($w$=Gaussian width), the value $w_b$ is the value which maximizes the field superposition integral $$S(w_b) = \int_o^\infty \phi(r)G(r,w_b)rdr \bigg/ \left( \int_o^\infty \phi^2(r)rdr \cdot \int_o^\infty G^2(r,w_b)rdr \right)^{\frac{1}{2}} \quad (1)$$

and is implicitly defined by the relation $$w_b = \left\{ \int_o^\infty \phi(r)G(r;w_b)r^3 dr \bigg/ \int_o^\infty \phi(r)G(r;w_b)rdr \right\}^{\frac{1}{2}} \quad (2)$$

A measurement method of value $w_b$ is described e.g. in the paper entitled "Spot-Size Measurements For Single Mode Fibers—A Comparison of Four Techniques" by W. T. Anderson and D. L. Philen, Journal of Lightwave Technology, Vol. LT-1, N. 1, March 1983, pp. 20 and ff. According to this paper, near-field intensity scanning of a light-beam at the output of the fibre under test is effected and function $G(r; w)$ which better approximates the experimental data is obtained by a computing system.

This known method presents two disadvantages, namely:

(1) intensity scanning is a rather long operation;
(2) complex processings of the experimental data are necessary to obtain $w_b$ value, and hence rather sophisticated computing means are required.

OBJECT OF THE INVENTION

The object of the present invention is to provide a method and an apparatus, based on the optical processing of the light beam sent into the fiber, which require neither beam scanning, thus allowing a quicker measurement, nor complex processing of experimental data, so that less sophisticated and hence less expensive computing means can be used.

SUMMARY OF THE INVENTION

According to the invention, the method of measurement of mode field radius in single-mode optical fibers, wherein a light beam is sent into an optical fiber under test and the intensity of the beam outgoing from the fiber is measured, is characterized in that: the light beam is subjected to spatial filtering by a mask having radial transmittivity distribution which can be represented by a Gaussian curve of given width, which mask modulates the beam; the intensity of the modulated beam is measured in correspondence with its axis; the mask position is varied so as to vary the spatial filtering effect, each new position corresponding to the filtering by a mask having a Gaussian distribution of transmittivity with different width; intensity measurement is repeated in correspondence with the modulated-beam axis for different width values; and, for each mask position the product is computed between the square root of the measured intensity and a parameter depending on the mask position, the mode field radius value being the width value which renders that product a maximum.

The modulation can be indifferently effected on the beam injected into or outgoing from the fiber.

In a first embodiment of the invention, the mask position is varied by translating the mask parallel to itself so as to change its distance with respect to the fiber input or output end, and the parameter depending on the mask position is represented by said distance.

The mask can be a circularly symmetric gray scale, whose transmittivity is maximum at the centre and minimum at the edges and varies according to a Gaussian law.

As an alternative, a mask can be used with perfectly transparent and perfectly opaque zones so that the mean radial transmittivity is a Gaussian function.

In a variant embodiment the beam to be modulated is collimated and the mask position is varied by varying the mask inclination with respect to beam propagation direction, and said parameter is the inverse of the square of the gaussian width. Also in this case the mask can consist of either a gray scale such as to maintain the Gaussian distribution, whatever the angle, or perfectly opaque and perfectly transparent zones, such that average transmittivity along a circumpherence, whatever the angle, be a Gaussian function.

The theoretical principles whereupon the method provided by the invention is based will be examined hereinafter.

A method of measurement of mode field radius wherein the beam outgoing from the fiber is modulated by a mask with transmittivity varying in radial direction is described for instance in the commonly assigned European Patent Application No. 145936, published on 26.06.1985.

This method exploits the definition of mode field radius as the near-field mean-square width (or the inverse of far-field width), and requires modulation by a mask whose transmittivity increases with the square of the transversal beam dimension.

This method cannot be used for a measurement based on the definition applied here. In fact, not only is the modulation law different in the two cases and requires masks whose transmittivity variation is of opposite sign (trasmittivity increasing towards the edges in the cited application and decreasing in the present invention), but also measurement methods are different, since the known method requires an intensity measurement also on the unmodulated beam and the measurements are of integral type, i.e. the whole beam intensity on the measurement plane and not only the intensity in correspondence with the beam axis, is to be determined. Finally, in the known method the mask effects an intensity modulation, while the present method carries out a field amplitude modulation, as will become clearer hereinafter.

The present invention includes also an apparatus for implementing this method, which apparatus comprises an optical beam source, a first optical system to transfer the beam to an optical fiber, a second optical beam to transfer the beam outgoing from the fiber onto a photodetector supplying electrical signals representing the beam intensity, and a computing and measuring system deriving the mode field radius from said electrical signals. The apparatus also comprises a spatial filter, whose transmittivity has a distribution which can be represented by a Gaussian function, and which radially modulates the beam and is mounted on a movable support allowing filter position to be altered so as to vary the effective Gaussian width, and in that the detector is adapted to supply signals representative of the intensity in correspondence with the beam axis, and the measuring and computing system is apt to derive the mode field radius value from the intensity values corresponding to the different filter positions.

BRIEF DESCRIPTION OF THE DRAWING

The invention will be described further with reference to the annexed drawing in which.

SPECIFIC DESCRIPTION

Figure 1:
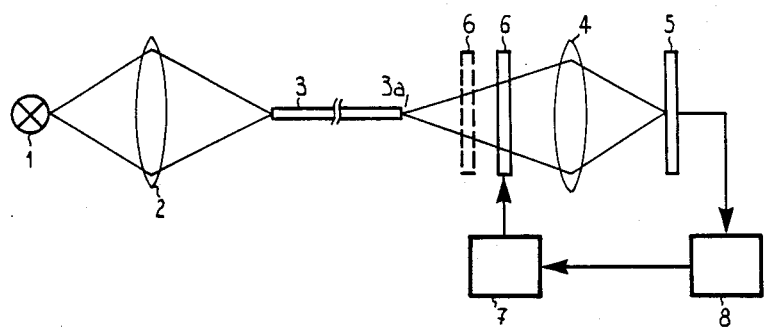
FIG. 1 is a schematic representation of a first embodiment of the invention.
Figure 4:
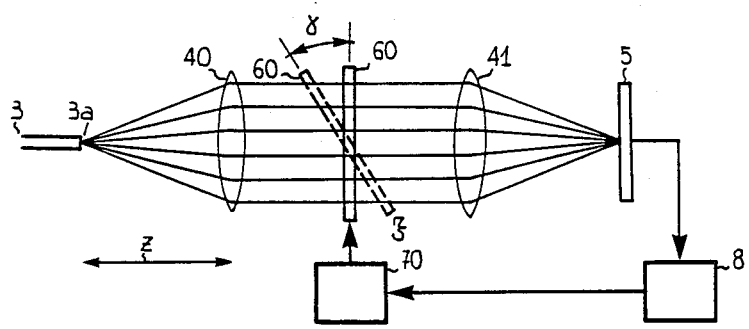
FIG. 4 is a schematic representation of a variant.

By way of example, FIGS. 1 and 4 depict the case in which a beam outgoing from the fiber is modulated, because that arrangement makes the following theoretical disclosure clearer; however, in both embodiments, as an alternative, the beam sent into the fiber can be modulated.

As shown in FIG. 1, a light source 1 emits a beam which, through an injecting optics 2, is sent into a single-mode fiber 3, whose mode field radius is to be determined.

The beam outgoing from fiber 3 is collected by an optical system 4 which forms an image of the fiber output face 3a on the sensitive surface of a detector 5, adapted to supply an electrical signal representing the beam intensity in correspondence with the fiber axis.

A mask or spatial filter 6 is inserted, coaxially to the beam, between fibre output 3a and optical system 4.

The mask modulates the beam field proportionally to $\exp(-r^2/2w^2)$, r being the radial coordinate of the beam with origin on the axis.

Mask 6 is mounted on a support, not represented, which is shifted by a suitable controller, schematized by block 7, to allow the distance of mask 6 from fiber end 3a to be varied.

Detector 5 is followed by a measuring and computing system 8, which, for each value of distance z between mask 6 and fiber 3, measures the value of light intensity Io in correspondence with the beam axis and calculates product $z \cdot \sqrt{Io(z)}$. The value of $w_b$ is obtained by computing system 8 from z value, which renders that product maximum.

This methodology depends on the characteristics of the system of FIG. 1, which is a kind of "image processor" based on Fourier optics. To evaluate its properties, it is convenient to simulate the filtering operation on plane 6 by considering a suitable "virtual field" $\phi_v$ in replacement of field $\phi$ at fiber output 3a. Field $\phi_v$ is defined so as to reproduce, by far-field propagation, the same distribution generated by the mask on plane 6. Hence the effect of $\phi_v$ in any other system point is equivalent to that produced by $\phi$ in presence of the mask.

More particularly, the image of $\phi_v$, possibly magnified, is formed on the detector plane in both cases. Thus, neglecting the magnification and diffraction effects of the optical systems, the resulting field on plane 5 can be computed on the basis of the of definition $\phi_v$, thereby obtaining far-field approximation equation:

$$\phi_v\left(\frac{k}{z}\vec{r_o}\right) = \phi\left(\frac{k}{z}\vec{r_o}\right) \cdot t(\vec{r_o}) \qquad (3)$$

where $r_o$ is the vector of position on plane 6 (with origin on the axis), $k = 2\pi/\lambda$ is the wave number at the wavelength used for the measurement, z the fibre-mask distance, t the amplitude transmittivity of the mask, $\psi$ and $\psi_v$ represent Fourier transforms of $\phi$ and $\phi_v$ respectively.

Antitrasforming relation (3) one obtains the expression of $\phi_v$ as convolution integral:

$$\Phi_v(\vec{r}) = \frac{A_o^2}{z^2} \cdot \iint_{-\infty}^{+\infty} \Phi(\vec{r'}) F^{-1} t\left[\frac{k}{z}(\vec{r}-\vec{r'})\right] d^2r' \quad (4)$$

where r is the vector radius on plane 3a (with origin on the axis), $F^{-1}t$ is the Fourier antitrasform of mask trasmittivity t(r), and $A_o$ is a constant, whose value depends on the wavelength and on the normalization type chosen for the transform.

Since transmittivity t is a Gaussian function, i.e. it is a function $t(r) = \exp(-r^2/2w^2)$, $F^{-1}t(\omega)$ will be proportional to $\exp(-w^2\omega^2/2)$, where $\omega = k/z (r-r')$.

Substituting in (4), taking into account value of $\omega$ and assuming:

$$w_b(z) = z/kw \quad (5)$$

virtual field $\phi_v$ in correspondence with the fiber axis becomes:

$$\phi_v(o) = \frac{A}{z^2} \int \phi(r) e^{-r^2/2w_b^2(z)} r dr \quad (6)$$

where A is a new constant, proportional to $k^2/\omega^2$ whose value presents no interest.

Comparing with (1), one can see that:

$$S \propto z \cdot \phi_v(o) \propto z \cdot \sqrt{I_o(z)} \quad (7)$$

where Io(z) is the field intensity in correspondence with the axis.

Since intensity I, as known, is proportional to $\phi_v^2$, the maximum of S may be determined simply by computing maximum of function $z \cdot \sqrt{Io(z)}$. Value $w_b$ is immediately obtained substituting in (5) value z' which renders such product maximum.

Figure 2:
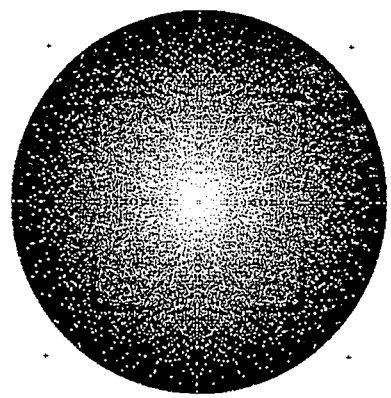
FIGS. 2 and 3 are examples of masks usable in the apparatus of FIG. 1.

To modulate the beam, a circularly symmetrical mask can be used, which mask consists of a gray distribution whose transmittivity is maximum at the center and zero at the edges and varies according to the above mentioned law. Such a mask can be obtained with photographic techniques. An example is shown in FIG. 2.

If field distribution is circularly symmetric, as generally occurs in single-mode fiber, a non-symmetric mask can be used, composed of perfectly opaque and perfectly transparent zones such that transmittivity, along any circumpherence of radius r, is proportional to $e^{-r^2/2w^2}$. Some examples of non-symmetric masks are shown in FIG. 3, showing masks comprising 1 to 9 opaque and transparent zones, obtained from suitable repetitions of arcs of curves which, in polar coordinates $(r, \theta)$, are described by the equation $\theta = C \cdot \exp(-r^2/2w^2)$.

Figure 3:
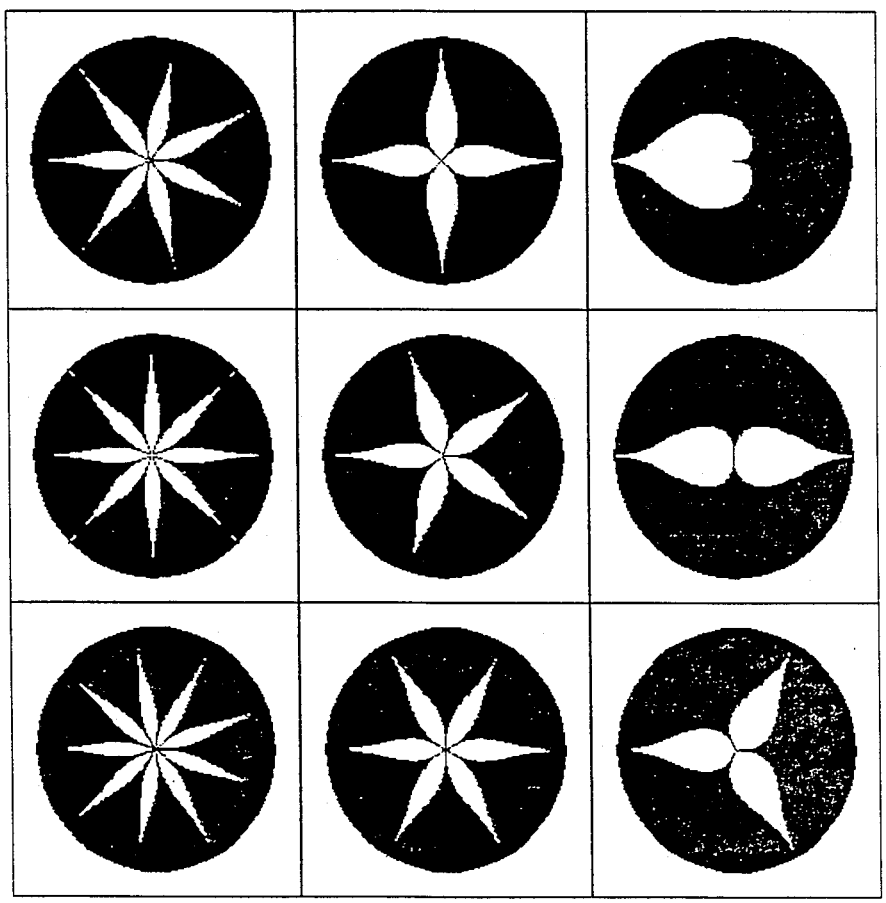

The masks shown in FIG. 3 can be quartz disks upon which a zero-transmittivity metal layer with desired boundaries has been deposited.

In the embodiment shown in FIG. 4, fiber end 3a is placed in the focus of an optical system 40, collimating the beam emitted from the source; the collimated beam is collected by an optical system 41 and concentrated on detector 5.

Mask or spatial filter 60, which modulates the beam intensity, is placed between optical systems 40, 41. Mask 60 is mounted on a support, not shown, which can be displaced by controller 70 to rotate the mask about an axis perpendicular to the plane of the drawing, and hence to vary the mask inclination with respect to the beam direction. For each value of angle $\gamma$ between mask 60 and beam direction, computing system 8 measures the beam intensity in correspondence with the fiber axis and calculates the ratio between the square root of the measured intensity and suitable function of angle $\gamma$; $\omega_b$ value is that maximizing such ratio.

In fact, let $\xi$, $\eta$ be the coordinates of any point of mask 60 with respect to a reference system in which axis $\eta$ is the mask rotation axis and axis $\xi$ the perpendicular to such an axis in the plane of mask 60. The mask with variable transmittivity $t(\xi, \eta)$, for a given value $\gamma$ of the inclination angle with respect to the beam propagation direction (with $x \leq 45°$), acts as a perpendicular mask with trasmittivity $t'(x, y) = t(x/\cos \gamma, y)$, where x and y are the coordinates in a reference system where axis y is still the mask rotation axis and axis x is the perpendicular to such an axis and to the beam propagation direction.

To carry out the present invention, the average transmittivity along a circumference of radius r of the filter used must be a Gaussian function, whatever the angle $\gamma$; in polar coordinates it therefore should be:

$$\frac{1}{2\pi} \int_o^{2\pi} t(\mu r \cos\phi, r \sin\phi) d\phi = \exp \frac{-r^2}{2\sigma^2(\mu)} \quad (8)$$

where $\mu = 1/\cos \gamma$.

If the beam has radial symmetry, the inclinable filter acts as an equivalent Gaussian filter whose mean transmittivity $\bar{t}(r)$, along a circumpherence of radius r, is given by the second member of equation (8). Then, the considerations made for the embodiment of FIG. 1 can be applied, by replacing parameter z with focal distance f of the collimation optics placed at the fiber output (FIG. 4) and $\omega$ with $\sigma$.

More particularly, relation (6), in which $w_b$ is given by $$w_b(\gamma) = \frac{f}{k\sigma} \quad (9)$$

is still valid. Consequently, as for FIG. 1, the value $\omega_b$ sought is the value which maximizes the ratio $S \propto I_o(\gamma)/\sigma(1/\cos \gamma)$.

Each function $t(\xi, \eta)$ satisfying equation (7) can be written as $$t(\xi,\eta) = \sum_{n=0}^{\infty} \sum_{m=0}^{\infty} (-\beta\xi^2)^n (-\alpha\eta^2)^m \frac{(n+m)!}{n!m!(2n-1)!!(2m-1)!!} \quad (10)$$

Coefficients $\alpha$, $\beta$ determine $\sigma(\mu)$ in the following way $$\sigma^2(\mu) = \frac{1}{\alpha + \beta\mu^2} \quad (11)$$

Relation (10) is obtained by developing in series of powers the two terms of (8) and then determining the coefficients of the series representing $t(\xi, \eta)$.

Functions (10) can be also negative: this causes no problem since it is sufficient to add a constant to expression (10) so that $t \geq 0$ everywhere.

A mask with transmittivity given by expression (10) consists of alternating opaque and transparent zones and can be obtained with photographic methods, even though the implementation with the desired accuracy can be complicated.

The implementation is simpler if the transmittivity of mask 60 varies in a single dimension, e.g. according to axis $\xi$. In this case coefficient $\alpha$ of relations (10) and (11) is zero and the mask presents a transmittivity:

$$\tau(\xi) = \sum_{n=0}^{\infty} (-\beta\xi^2)^n \frac{1}{(2n-1)!!} \qquad (12)$$

Figure 5:
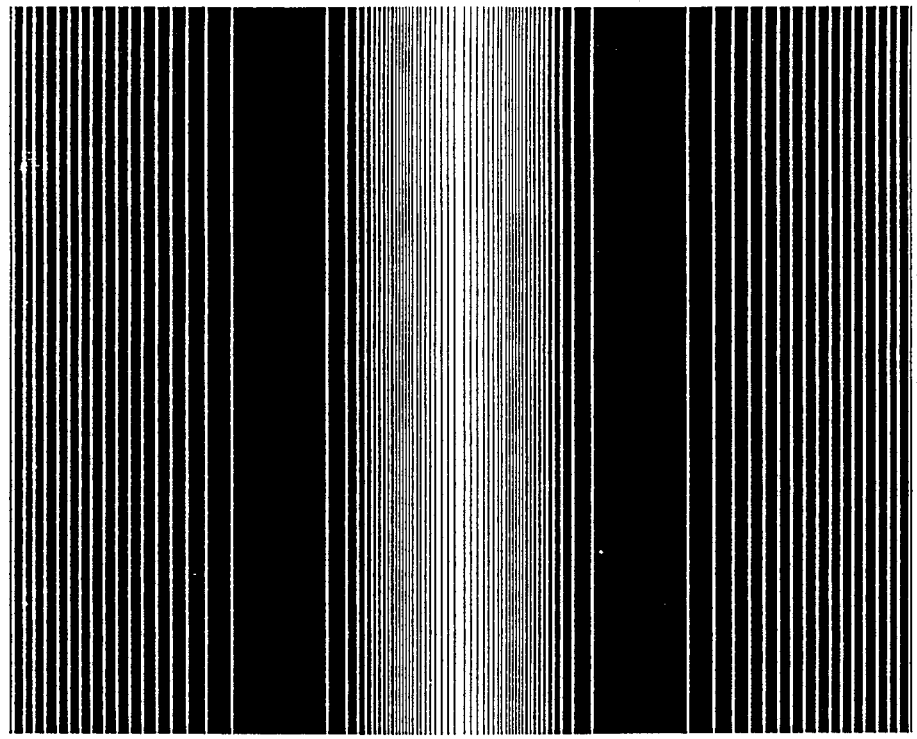
FIG. 5 is an example of a mask usable in the apparatus of FIG. 4.

An example of mask with transmittivity given by (12) is shown in FIG. 5.

Advantageously, in both embodiments the apparatus is automatized. To obtain that, computing and measurement system 8 can be part of a computer which is connected to control devices 7 or 70 of the mask support 6 or 60 and controls its displacements with the described modalities.

We claim:
1. A method of measuring mode field radius in a single-mode fiber wherein an optical beam is sent into an optical fiber under test and the intensity of the beam outgoing from the fiber is measured, said method comprising the steps of:
 subjecting the light beam to a spatial filtering with a mask having a radial distribution of intensity representable with a Gaussian curve of given width, which mask modulates the beam;
 measuring the intensity ($I_o$) of the modulated beam is measured in correspondence with its axis;
 varying the mask position so as to vary the spatial filtering effect, each new position corresponding to the filtering with a mask having a Gaussian distribution of intensity of different width;
 repeating the measurement of intensity ($I_o$) in correspondence with the modulated beam axis for different width values; and
 for each position of the mask, calculating the product between the square root of measured intensity ($I_o$) and a parameter depending on the mask position, the mode field radius value ($w_b$) being the width value which renders that product maximum.

2. The method defined in claim 1 wherein the beam entering the fiber is subjected to spatial filtering.

3. The method defined in claim 1 wherein the beam outgoing from the fiber is subjected to spatial filtering.

4. The method defined in claim 1 wherein the position of the mask is varied by translating the mask parallel to itself so as to vary its distance (z) with respect to a fiber end, and the parameter depending on the mask position is represented by said distance (z).

5. The method defined in claim 1 wherein the beam is collimated prior to modulation and the position of the mask is varied by changing the mask inclination with respect to the beam propagation direction, said parameter being the inverse of the square of the Gaussian width.

6. An apparatus for measuring mode field radius in a single-mode optical fiber comprising:
 a source of an optical beam;
 a first optical system to transfer the beam into an optical fiber;
 a second optical system to transfer the beam outgoing from the fiber to a photodetector which supplies electrical signals representing the beam intensity;
 a measuring and computing system which derives a value ($w_b$) of the mode field radius from said electrical signals; and
 a spatial filter coaxial with the beam and of a transmittivity having a distribution which can be represented by a Gaussian function, said filter radially modulating the beam and being mounted on a movabale support allowing the variation of the position of the filter so as to vary the Gaussian width, said detector being arranged to supply signals representing the intensity ($I_o$) in correspondence with the beam axis, the computing and measurement system being constructed to obtain the value ($w_b$) of the mode field radius from the measured values of intensity ($I_o$) relating to the different positions of the filter.

7. The apparatus defined in claim 6 wherein said filter is placed between the source and an input end of the fiber.

8. The apparatus defined in claim 6 wherein said filter is inserted between an output end of the fiber and the detector.

9. The apparatus defined in claim 6 wherein the filter support is connected to control a device operating the support so as to translate the filter parallel to itself in the beam propagation direction and to vary the distance between the filter and an end of the fiber.

10. The apparatus defined in claim 9 wherein said filter consists of a circularly symmetric mask, with maximum transmittivity at the center and zero transmittivity at the edges.

11. The apparatus defined in claim 9 wherein said filter consists of a circularly asymmetric mask, consisting of opaque and transparent zones such that the mean transmittivity along a circumference of radius r centered on the axis is a Gaussian function of the radius.

12. The apparatus defined in claim 6, further comprising a further optical system collimating the beam to be modulated, said filter support being connected to a control device operating the support to cause filter to tilt about an axis perpendicular to the propagation direction of the collimated beam so as to vary the inclination of the filter with respect to the propagation direction.

13. The apparatus defined in claim 12, wherein said filter consists of a plane mask with transmittivity varying at least in one of its dimensions so that for each value of said distance (r) from the beam axis the mean transmisttivity on a circumference of radius r with center on the axis is a Gaussian function.

14. The apparatus defined in claim 6 characterized in that a processor, comprising said measurement and computing system, operates a control device for the support of the filter.

* * * * *